US007493311B1

(12) United States Patent
Cutsinger et al.

(10) Patent No.: US 7,493,311 B1
(45) Date of Patent: Feb. 17, 2009

(54) INFORMATION SERVER AND PLUGGABLE DATA SOURCES

(75) Inventors: Paul L. Cutsinger, Redmond, WA (US); Zhong Chen, Sammamish, WA (US); Robert S. Wigton, Redmond, WA (US); Rick Molloy, Redmond, WA (US); John R. Bartlow, Bothell, WA (US); Lei Tan, Bellevue, WA (US); Derek R. Westcott, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 408 days.

(21) Appl. No.: 10/610,258

(22) Filed: Jun. 30, 2003

Related U.S. Application Data

(60) Provisional application No. 60/400,481, filed on Aug. 1, 2002.

(51) Int. Cl.
G06F 7/00 (2006.01)
G06F 17/30 (2006.01)
G06F 17/20 (2006.01)
(52) U.S. Cl. .................. 707/3; 707/4; 707/10; 715/200
(58) Field of Classification Search ...................... 707/4, 707/10, 104.1; 709/245, 315
See application file for complete search history.

(56) References Cited

U.S. PATENT DOCUMENTS

| 5,826,270 | A | * | 10/1998 | Rutkowski et al. | ............ 707/10 |
| 5,974,409 | A | * | 10/1999 | Sanu et al. | ............ 707/3 |
| 6,029,147 | A | * | 2/2000 | Horadan et al. | ............ 705/35 |
| 6,058,394 | A | * | 5/2000 | Bakow et al. | ............ 707/10 |
| 6,351,776 | B1 | * | 2/2002 | O'Brien et al. | ............ 709/245 |
| 6,360,205 | B1 | * | 3/2002 | Iyengar et al. | ............ 705/5 |
| 6,735,598 | B1 | * | 5/2004 | Srivastava | ............ 707/103 R |
| 6,898,591 | B1 | * | 5/2005 | Moon et al. | ............ 707/3 |
| 6,941,295 | B2 | * | 9/2005 | Nakamura et al. | ............ 707/3 |
| 6,941,299 | B2 | * | 9/2005 | Heuer | ............ 707/4 |
| 6,957,214 | B2 | * | 10/2005 | Silberberg et al. | ............ 707/4 |
| 2001/0023414 | A1 | * | 9/2001 | Kumar et al. | ............ 705/35 |
| 2002/0078216 | A1 | * | 6/2002 | Pankovcin et al. | ............ 709/230 |
| 2002/0133504 | A1 | * | 9/2002 | Vlahos et al. | ............ 707/104.1 |
| 2002/0184401 | A1 | * | 12/2002 | Kadel et al. | ............ 709/315 |
| 2003/0023607 | A1 | * | 1/2003 | Phelan et al. | ............ 707/100 |

* cited by examiner

*Primary Examiner*—Tony Mahmoudi
*Assistant Examiner*—Paul Kim
(74) *Attorney, Agent, or Firm*—Birch, Stewart, Kolasch & Birch, LLP

(57) ABSTRACT

An information server may function as a centralized query broker that accepts queries from query clients, dispatches queries to potentially disparate data sources, and returns query results to query clients. An information server may centralize information access and security/control operations and may provide a set of uniform interfaces for accessing various types of data sources. A pluggable data source interface may be used for extending the data and actions that are available to an information server. The queries that arrive at the data sources are typically simple queries, which contain no sub-query addressing to a different data source. To make a data source pluggable, a data source may expose a standard interface and may store information about the data source's existence so that an information server will be able to determine, from the stored information, which data sources are available for responding to queries in the information server system.

18 Claims, 5 Drawing Sheets

INFORMATION SERVER AND PLUGGABLE DATA SOURCES

RELATED APPLICATIONS

This application claims priority to U.S. Provisional Application Ser. No. 60/400,481, filed Aug. 1, 2002, the entire disclosure of which is incorporated herein by reference.

TECHNICAL FIELD

Embodiments of the invention relate generally to querying data sources. More particularly, the invention relates to an information-server system in which an information server brokers queries between a query client and data sources that may be disparate.

BACKGROUND OF THE INVENTION

Software, such as an application program like Microsoft® Money, is often viewed as monolithic in the sense that an entire application program functions as a unified whole. At a number of levels within the vertical architecture of such an application program, code has been written to do a particular type of calculation or task, such as formulating a budget report that compares a list of budgeted amounts to a user's transactional spending for the last month, generating a cash-flow forecast into the future, and the like.

Conventionally, it has not been possible to efficiently and easily retrieve bits and pieces of such an application program's stored data. The advent of the World Wide Web has made the ability to retrieve data selectively from an application program even more attractive from a usability standpoint. The ability to obtain and collect information from different places and bring together just what is relevant for the user is a desirable functionality for software.

The architecture of many application programs, such as Microsoft® Money, may be such that each component responsible for doing budgeting or cash-flow etc. may have been written in a very particular way to accomplish each particular task.

It would be desirable to impose on an application program's code base a fairly easy, and fairly extensible, way to uniformly permit some other entity, be it a Web page, or a plug-in to Internet Explorer (IE), or a background process that runs on a server, to communicate with specific components within that code base without the other entity needing to have a thorough understanding of the application program's internals. In this way, the development and test costs of writing to individual different Application Programming Interfaces (APIs) within the application program may be avoided.

Software developers that are sometimes referred to as "vertical tool providers" often want to build add-ons to popular software products. A system in which a simple API can be constructed for querying a local data store beneath a desktop application, such as Microsoft® Money, would be desirable. An API of this type may advantageously provide a fundamental data interchange mechanism for accessing a local data store.

Accordingly, a pluggable data source software component, or region of code, which can be arbitrarily selected, that implements a pluggable data source interface and participates in a uniform query system, thereby absolving an entity issuing a query from needing to know implementation details of the data source software component, or region of code, beyond what is necessary for interfacing with a centralized query broker, also referred to herein as an information server, would be desirable.

SUMMARY OF THE INVENTION

An information server in accordance with an illustrative embodiment of the invention may function as a centralized query broker that accepts queries from query clients, dispatches queries to potentially disparate data sources, and returns query results to query clients. An information server may centralize information access and security/control operations and may provide a set of uniform interfaces for accessing various types of data sources.

An information server system in accordance with an illustrative embodiment of the invention advantageously provides an ability to retrieve data from heterogeneous data sources by sending queries to the data sources. Accordingly, data sources with drastically different schemas, such as relational databases and data sources containing non-relational data, such as results from a calculation engine or data from sources other than a relational database, may participate in an information server system in accordance with the invention.

A pluggable data source interface, in accordance with an illustrative embodiment of the invention, is a mechanism for extending the data and actions that are available to an information server. A data source is a component that fulfills data queries from an information server. The queries that arrive at the data source are typically simple queries, which contain no sub-query addressing to a different data source. To make a data source pluggable, a set of standard interfaces may be defined. A data source may expose a standard interface and may store information about the data source's existence so that when an information server starts its initialization process, the information server will be able to determine, from the stored information, which data sources are available for responding to queries in the information server system.

In addition to implementing a data source interface and storing registration information, a data-source map may be built. The data source map may be a cached version of the stored registration information, such as stored registry settings pointing to Dynamic-Link Libraries (DLLs) that may be loaded for fulfilling particular queries. URNs, Universal Resource Names, may be used for indexing data sources, to indicate which data source is responsible for fulfilling a particular query. Once a data source map of this type has been constructed, rules may be created to specify fallback data sources to be used upon unavailability of a data source. An information server may also persist unfulfilled queries, such as by storing to a local disk any unfulfilled queries, so that the unfulfilled queries may be fulfilled when the unavailable data source becomes available.

An information server system in accordance with an illustrative embodiment of the invention may include an authentication layer for preventing unauthorized access to data sources.

An information server may perform action queries for writing data to a data source, as opposed to queries being limited only to reading data from data sources. Action queries of this type may be persisted locally in a queue. The next time the data source is available, the information server may recognize the data source's availability and complete the action queries to write the data to the data source. An information server may also supplement this support for action queries with bidirectional notification support, so that the clients of the system are aware that such changes have been made.

Persistence of this type may be used for an on-line scenario, such as a user that wants to interact, at work, with data stored locally on the user's computer at home. An action query to write data that is destined for one of the user's data files on the user's home computer may be persisted on a networked server. When the user returns home and instantiates the information server, the information server may access the queries persisted on the networked server and process the final stages of those transactions.

An information server may provide the above services while remaining functionally agnostic to the specific semantics of any single query language. The server may broker the interchange of retrieval or action queries between and across data sources without holding deep knowledge of the query language, or imposing heavy restrictions on its scope of support.

Additional features and advantages of the invention will be apparent upon reviewing the following detailed description.

DETAILED DESCRIPTION OF THE INVENTION

I. Exemplary Operating Environment

Aspects of the invention are suitable for use in a variety of computing system environments, including distributed computing environments. In distributed computing environments, tasks may be performed by remote computer devices that are linked through communications networks. Embodiments of the invention may comprise special purpose and/or general purpose computer devices that each may include standard computer hardware such as a central processing unit (CPU) or other processing means for executing computer executable instructions, computer readable media for storing executable instructions, a display or other output means for displaying or outputting information, a keyboard or other input means for inputting information, and so forth. Examples of suitable computer devices include hand-held devices, multiprocessor systems, microprocessor-based or programmable consumer electronics, networked PCs, minicomputers, mainframe computers, and the like.

Embodiments of the invention will be described in the general context of computer-executable instructions, such as services, that are executed by a personal computer or a server. Generally, services may include routines, programs, objects, components, data structures, etc., that perform particular tasks or implement particular abstract data types. Typically the functionality of the services may be combined or distributed as desired in various environments.

Embodiments of the invention may also include computer readable media having executable instructions. Such computer readable media can be any available media, which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions and which can be accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

Figure 1:
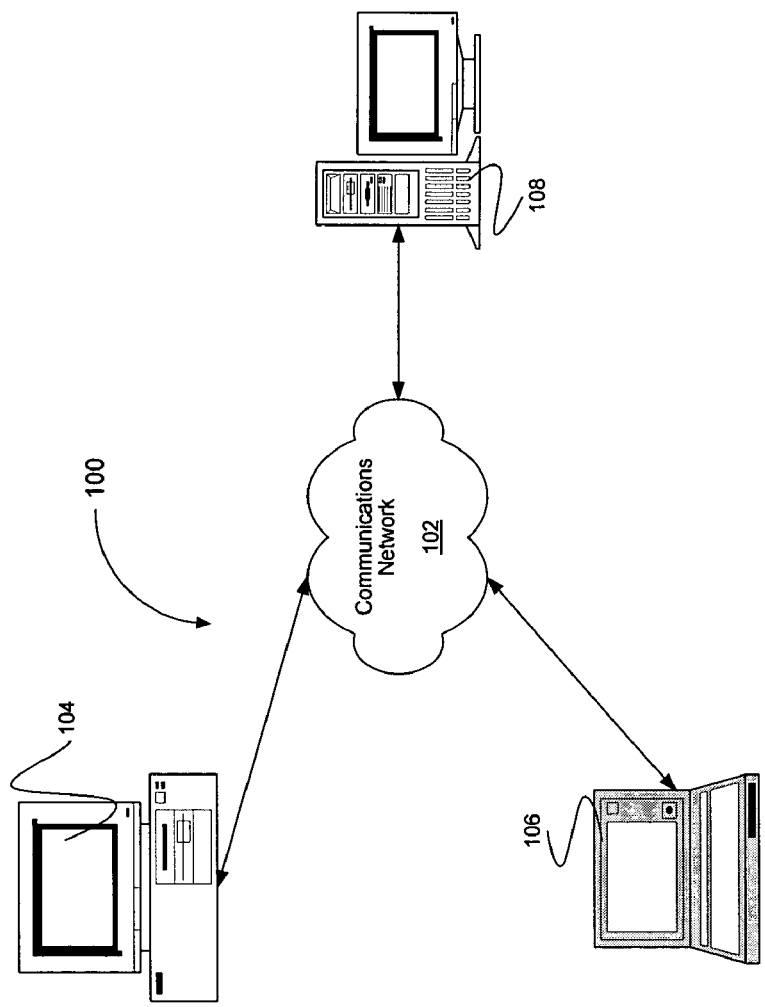
FIG. 1 is a schematic block diagram of a conventional distributed general-purpose digital computing environment that can be used to implement various aspects of the invention.

FIG. 1 illustrates an example of a suitable distributed computing system 100 operating environment in which the invention may be implemented. Distributed computing system 100 is only one example of a suitable operating environment and is not intended to suggest any limitation as to the scope of use or functionality of the invention. System 100 is shown as including a communications network 102. The specific network implementation used can comprise, for example, any type of local area network (LAN) and associated LAN topologies and protocols; simple point-to-point networks (such as direct modem-to-modem connection); and wide area network (WAN) implementations, including public Internets and commercial based network services. Such a network implementation may be wired, wireless, or a combination of wired and wireless. Systems may also include more than one communication network, such as a LAN coupled to the Internet.

Computer device 104, computer device 106, and computer device 108 may be coupled to communications network 102 through communication devices. Network interfaces or adapters may be used to connect computer devices 104, 106, and 108 to a LAN. When communications network 102 includes a WAN, modems or other means for establishing communications over WANs may be utilized. Computer devices 104, 106 and 108 may communicate with one another via communication network 102 in ways that are well known in the art. The existence of any of various well-known protocols, such as TCP/IP, Ethernet, FTP, HTTP and the like, is presumed.

Computer devices 104, 106 and 108 may exchange content, applications, messages and other objects via communications network 102. In some aspects of the invention, computer device 108 may be implemented with a server computer or server farm.

Computer device 108 may also be configured to provide services to computer devices 104 and 106. Alternatively, computing devices 104, 106, and 108 may also be arranged in a peer-to-peer arrangement in which, for a given operation, ad-hoc relationships among the computing devices may be formed.

II. Introduction to Information Server and Pluggable Data Sources

II.A. Information Server

Figure 2:
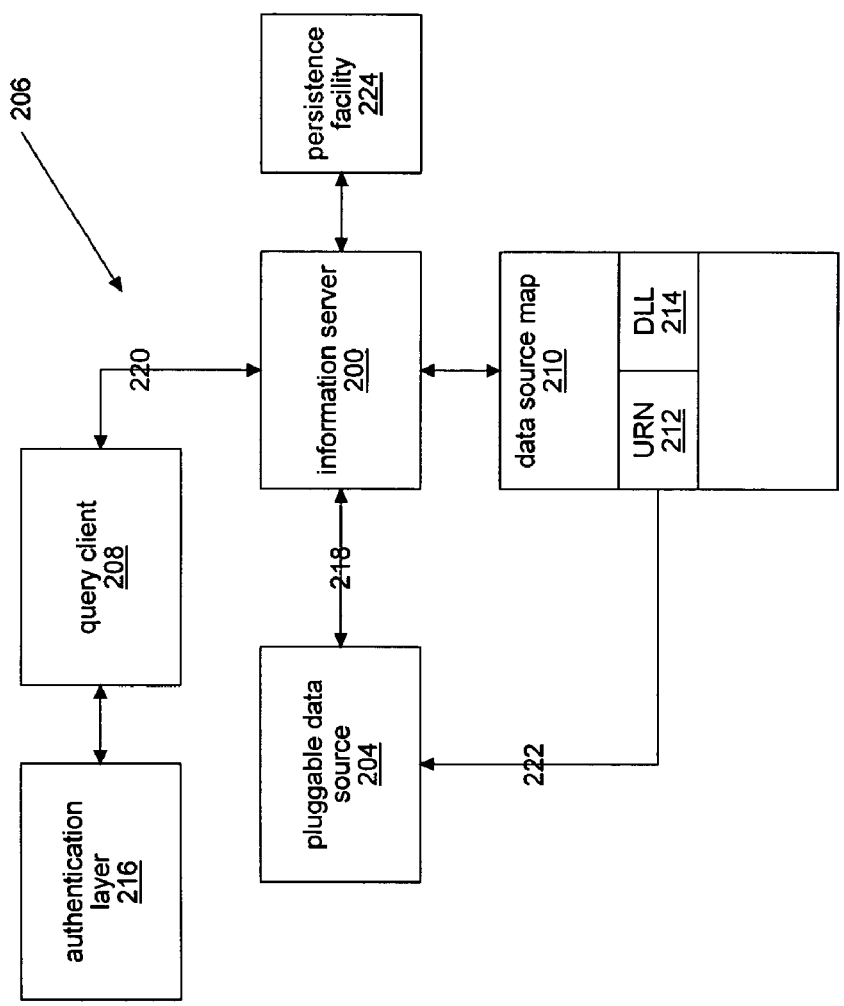
FIG. 2 is a schematic block diagram of an information-server system in accordance with an illustrative embodiment of the invention.

Referring to FIG. 2, an information server 200 in accordance with an illustrative embodiment of the invention may function as a centralized query broker that accepts queries from query clients 208, dispatches queries to potentially disparate data sources 204, and returns query results to query clients 208. An information server 200 may centralize information access and security/control operations and may provide a uniform access interface.

An information server system 206 in accordance with an illustrative embodiment of the invention advantageously provides an ability to retrieve data from heterogeneous data sources 204 by sending queries to the data sources 204. Accordingly, data sources 204 with drastically different schemas, such as relational databases and data sources 204 containing non-relational data, such as results from a calculation engine or data from sources other than a relational database, may participate in an information server system 206 in accordance with the invention.

II.B. Pluggable Data Source

A pluggable data source interface 218, in accordance with an illustrative embodiment of the invention, is a mechanism for extending the data and actions that are available to an information server 200. An exemplary embodiment of a pluggable data source interface 208 is described below, including discussion in the context of a Money Information Server (MIS) 300 (FIG. 3) for accessing a user's financial data stored by the Microsoft® Money application program.

An information-server data source 204 is a component, which may be a Component-Object-Model (COM) server, that fulfills data queries, such as queries to a user's Money data file, from an information server 200. The queries that arrive at the data source 204 are typically simple queries, which contain no sub-query addressing to a different data source 204. In accordance with an illustrative embodiment of the invention, a data source 204 may be implemented as a COM server, which may be constructed as either an out-of-proc server or in-proc-server. For a data source 204 that requires Passport authentication, an in-proc server may be used so that logon does not need to be managed by the data source 204 itself. For queries to a user's Money data file, queries may be issued for list retrieval, creation, update, and deletion operations to be performed on the data source 204.

II.C. Initialization of the Information Server

To make a data source 204 pluggable, a set of standard interfaces may be defined. In accordance with an illustrative embodiment of the invention substantially all of the data sources 204, which participate in data queries within an information server system 206, may implement the set of standard interfaces. A data source 204 may expose a standard interface and may store information about the data source's existence. This information may be stored in the Windows Registry. So when an information server 200 starts its initialization process, the information server may look for this stored information to figure out which data sources 204 are available for responding to queries in the information server system 206.

II.D. Implementation and Registration of Pluggable Data Sources

To implement a new data source 204, information about the existence of the data source 204 may be stored, such as in the Windows registry, and the data source 204 may implement a standard data source interface, which can be thought of like a contract between the data source 204 and the information server 200 so that they can communicate with each other. The data source 204 may use an interface from the information server 200 to send query results and notification types of messages to the information server 200.

Fulfilling data queries may be done in data-source specific ways. For instance, if the data to be retrieved is stored locally, then the information server 200 may access the data and package the result into a format, such as Extensible Markup Language (XML) or any other suitable format, used for responding to queries from query clients 208. If the information server 200 is connecting to the network to retrieve data for query fulfillment, then the information server 200 may interact with a distributed data source 204 through an appropriate protocol, such as Hypertext Transfer Protocol (HTTP) or any other suitable protocol. The information server 200 may then package the result in a manner similar to that discussed above in connection with the discussion of locally stored data.

As mentioned above, XML may be used as an interchange format within an information server system 206, for both the queries themselves and the result sets or return values from those queries. XML advantageously is able to accommodate diverse schemas associated with various data sources 204 and is not restricted to relational database-type schemas.

II.E. Data-Source Map

In addition to implementing a data source interface and storing registration information, a data-source map 210 may be built. The data source map may be a cached version of the stored registration information, such as stored registry settings pointing to DLLs that may be loaded for fulfilling particular queries. URNs 212, Universal Resource Names, may be used for indexing data sources 204, to indicate which data source 204 is responsible for fulfilling a particular query. A data-source map may include a data source's URN and a DLL 214, which may be actually a class ID of a COM object.

Once a data source map 210 of this type has been constructed, rules may be created to specify fallback data sources 204 to be used upon unavailability of a data source 204. So, if multiple data sources 204 can each potentially supply the same piece of information, such as a stock quote, a rule may be created to specify that one of the data sources 204 is a primary data source 204 and that one or more other data sources 204 are fallback data sources 204 to be used upon unavailability of data from the primary data source 204.

II.F. Authentication

An information server system 206 in accordance with an illustrative embodiment of the invention may include an authentication layer for preventing unauthorized access to data sources 204. An authentication layer 216 may use Passport Authentication from the query client 208. The query client 208 may obtain an authentication credential, which is unique to a user, from a Passport Authentication server. The query client 208 may then forward the authentication credential to an information server 200 upon connecting to the information server 200. The information server 200 may then use the credential to grant access to a locally stored data file for providing information, such as accounts and transactions, to the query client 208. Other suitable authentication layers could use a certificate system, Windows operating system authentication, a custom password scheme, or the like.

II.G. Persisting Unfulfilled Queries

At particular times, one or more data sources 204 may be unavailable for fulfilling queries. An information server 200 may persist unfulfilled queries, such as by storing to a local disk any unfulfilled queries.

An information server 200 may perform action queries for writing data to a data source 204, as opposed to queries being limited only to reading data from data sources 204. Action queries of this type may be persisted locally in a queue. The next time the data source 204 is available, the information server 200 may recognize the data source's availability and complete the action queries to write the data to the data source 204.

Persistence of this type may be used for an on-line scenario, such as a user that wants to interact, at work, with data stored locally on the user's computer at home. An action query to write data that is destined for the user's Money file on the user's home computer may be persisted on a server, such as computer device 108 (FIG. 1). When the user returns home and instantiates the information server 200, the information server 200 may access that queue of unfulfilled queries and process the final stages of those transactions.

III. Information Server and Pluggable Data Sources

Figure 3:
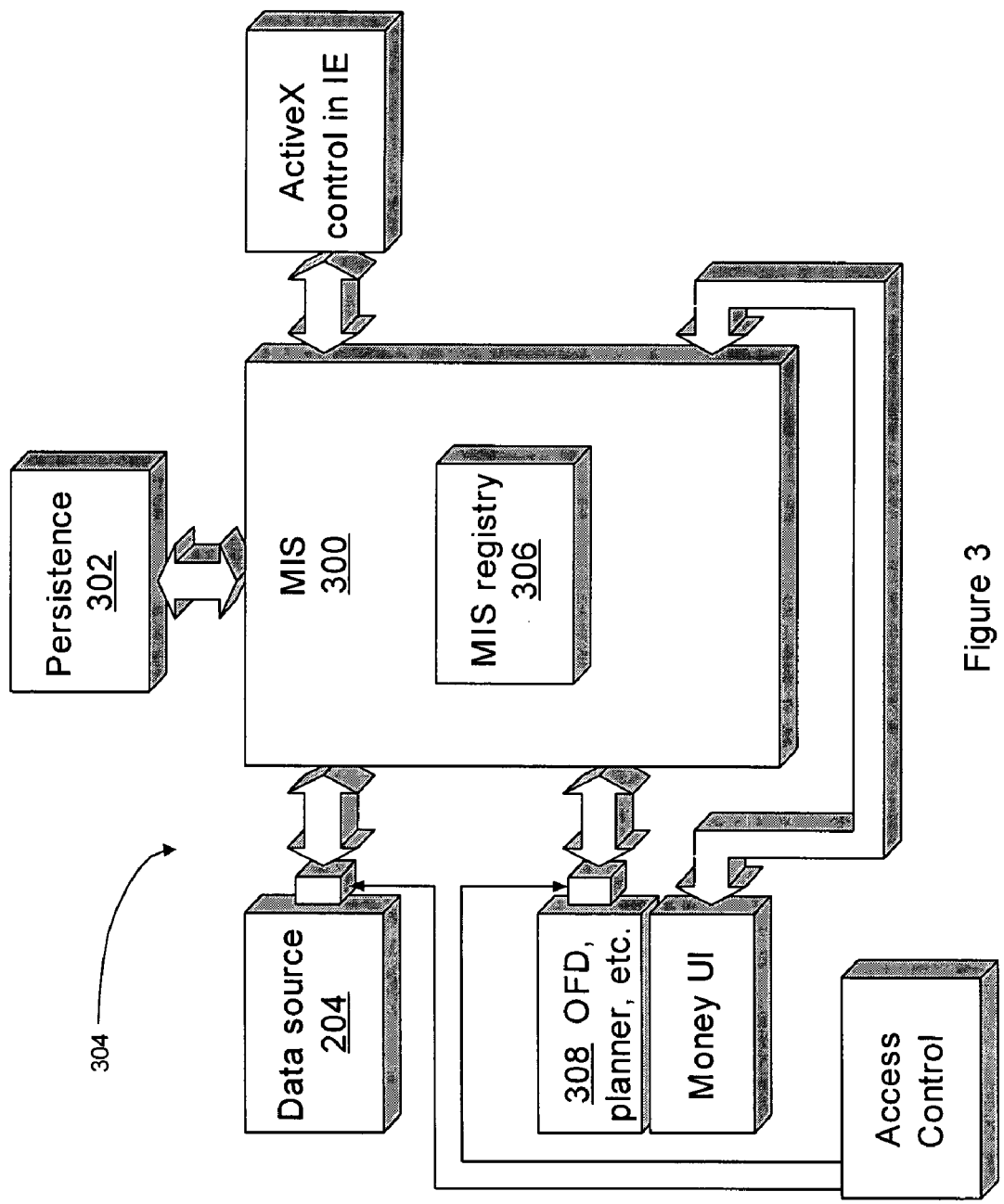
FIG. 3 is a schematic block diagram of selected components of an information-server system in accordance with an illustrative embodiment of the invention.

Referring to FIG. 3, as mentioned above, an exemplary embodiment of an information server system 206 for use in conjunction with Microsoft® Money may be referred to as an MIS (Money Information Server) system 304. While the discussion above tended to discuss an information server system 206 more generally, the remaining sections of this detailed description will tend toward a more detailed discussion of a Money Information Server system 304.

Using Microsoft® Money as an example application program, users may want to access different views of their information while they are not actively using Money itself. For example, if the user is reading an article about the stock market and one of their stocks is mentioned, it's likely that they'll want to view or work with their information related to that stock.

An information server 200 may be used to enable this scenario. The information server 200 may broker queries between query clients 208 and an appropriate data source 204. In the above example, the client may be the web page itself or the MoneySide feature of Microsoft® Money. MoneySide, is an Internet Explorer add-on that can be considered an online assistant. As an authenticated user browses the Web via Internet Explorer, the MoneySide Explorer bar displays financial information from the user's Money data file. By putting relevant numbers in front of a user while the user's online, MoneySide enhances the user's ability to make well-informed decisions. The data sources 204 may be the user's Money data file, their portfolio data on the MSN® Money servers, information on the web page, or a combination of any or all of these.

The MoneySide feature provides other example solutions of user problems that an MIS 300 can enable. The existing features include scenarios in the areas of investing, shopping, banking, accounts, and planning. These can be expanded to include scenarios that involve various subsets of the user's financial information like taxes, form filling, providing demographic data, and the like.

Data sources 204 may be attached to MIS 300 to provide a rich set of information. The data sources 204 may include OFD (open financial data), planner, and server store (e.g., UPS (user profile store) or MoneyCentral). Query clients 208 connect to MIS 300 to query from the data sources 204. Information may be retrieved through a query interface.

MIS 300 may be a mediator of data sources 204 rather than a data warehouse of the data sources 204. This means that MIS 300 may not duplicate or permanently hold information itself except for transient caches. MIS 300 may direct queries received from query clients 208 to data sources 204, and may pass query results received from the data sources 204 back to the query clients 208.

Various types of exemplary usage scenarios include, but are not limited to: inside Microsoft® Money, the UI (user interface) code queries for information via MIS 300. An Internet Explorer page starts Money in no-UI mode, and queries for Money information via MIS 300. On a client machine without Money running, MIS 300 retrieves information from server persistence or some local storage, and caches the query for processing later. On a server machine, such as computer device 108, server-side code accesses information via MIS 300.

Several feature scenarios will be discussed for illustration purposes. A user may have a financial profiler stored on a server. A financial profiler is a sub-set of a Money user's data (e.g. account list, bills, etc.). At work, the user may open an MSN® home page in IE. The home page may access the user's financial profiler via MIS 300, and may display upcoming bills.

At work, a user may make a purchase via a website. A purchase receipt query may then be entered via MIS 300. Since Money is not installed on the machine, the query may be queued on MIS's persistence store 302. When the user returns home, the query may be forwarded to Money via MIS 300 running on the home machine. If the purchase is made at home, the transaction may be entered in Money automatically.

Money Express may query upcoming bills via a mechanism similar to the one discussed above in connection with the MSN® home page. Money Express operates independently of Money and lets a user enter transactions that are later moved into the user's Money data file. Money Express also display reminders of upcoming bills and alerts.

As discussed above, an information server 200, such as MIS 300, may act as a query broker or mediator. An information server 200 may receive compound queries and may then delegate simple queries to appropriate data sources 204. Money Query Language (MQL) queries may be used for list retrieval, creation, update, and deletion operations to be performed on a data source 204 by building XML-based queries. An interface of the data source 204 may be used for providing awareness, to an information server 200, of the data and functionality that the data source 204 supports and may specify which of the MQL operations are valid for that data source 204.

A pluggable data source 204 may work with an MIS 300 to address issues, including, but not limited to: some data sources 204 may not be present on some computer systems with MIS 300; data sources 204 may be added and removed dynamically; and creating a new data source 204 should not require a version change for MIS 300.

The pluggable data source interface advantageously provides an ability to have a flexible database-like query system that can accommodate different types of data without changing the interface. In a manner that is similar to the way that additional tables of a database can be added to extend an original database without changing the database access methods, additional data sources 204 may be added to MIS 300 without fundamentally changing the MQL or MIS 300.

A pluggable data source interface may address this issue by being self-registering and self-describing at install time to MIS 300. In this way, MIS 300 and a subset of the data sources 204 may be installed in some environments and data sources 204 may be added as desired without taking on the additional development time of modifying MIS 300.

An MIS system 304 in accordance with an illustrative embodiment of the invention, allows flexible extensions of data sources 204 into the system to process new types of queries. Several data sources 204 may be added to the MIS system 304. For example, the following types of data sources 204 may be added: raw data accessing (OFD (Open Financial Data), UPS (User Profile Store), and UPS-OFD); data and calculation engines (report/planner/tax); and data source that will perform actions (statement reconciliation and writing data) upon receiving a query direction the data source to do so.

III.A. Data source Registration Information

As discussed above, data source information may be stored in MIS's registry thereby enabling data sources 204 to be started on demand. In order to provide seamless processing when a data source 204 is not present, along with persistence support, schemas-related information may be maintained by MIS 300. Maintaining information of this type enables MIS 300 to verify a query's validity before the query is persisted. Two tables may be used for maintaining this information.

The first table may be an available-data-source table. The first column may hold the data sources' Uniform Resource Identifiers (URIs), and the second column may contain the classid's for the data sources 204. Queries to data sources 204 listed in the second table (discussed below), but not in the first table, may be redirected to persistence. The table may be stored in HKLM\Software\Microsoft\MIS\DatasrcStart. URIs may be the subkeys, and classids may be the default string values for the subkeys. This table may be maintained by individual data sources 204. The data sources 204 may register/unregister themselves during installation/uninstallation.

The second table may be a data-source query-schema table. The first column may hold the data sources' URI; the second column may be a path to a query schema file. These schema files may be located on a user's local machine. This table may be stored in HKLM\Software\Microsoft\MIS\DatasrcSchema. URIs may be the subkeys, and a schema file path may be the schema string values under subkeys.

The schema table along with the schema files may be posted on a web server. MIS 300 may periodically connect to the server, and download updated information. When a server update is detected, MIS 300 may pause schema validation and reload new schemas. The downloaded schema files may be stored under a system path for the current user.

III.A.1. Fallback Data Sources

An information server system 206 in accordance with an illustrative embodiment of the invention may make multiple data sources 204 appear to a query client 208 as if the data sources 204 are one.

Within a query, information from two multiple data sources may be requested. For example, a query might ask for information from both an application program's local store, such as user's Money data file, and from a server-based store, such as UPS (user profile store). Within a single query, information from both of these sources may be requested. A query language in accordance with an illustrative embodiment of the invention may include semantics and grammar for specifying from which data sources 204 data should be retrieved. The URN (universal resource name) of each of the data sources 204 may be used for this type of data source identification. When parsing a query of this type, the information server 200 may perform a lookup into the data-source map 210 to make sure that pertinent data sources 204 are available.

Different data sources 204 may have different query fulfillment behaviors. One data source 204 might fulfill queries relatively quickly and simply. A different data source 204 may require more time to respond to a query. The ultimate output that the user has requested may require interleaving information from multiple data sources 204 that respond to queries within different time frames. An information server 200 may queue partial query results while waiting for an unfulfilled portion of the query before sending the query results to the query client 208.

III.B. Information-Server interfaces for Communicating with Query Clients and Data Sources MIS interfaces, depicted by double-headed arrows 218 and 220 in FIG. 2, may be COM interfaces. A basic reason that COM exists is to provide a way that software developers can write applications that can instantiate one another and interoperate with one another by asking one another to do so. The COM standard is essentially a recommendation on how to structure a communications interface that gets exposed to other software modules. A COM interface permits other software entities to determine what functions are available and to call these functions.

In accordance with an illustrative embodiment of the invention, low-level communication interfaces are established for communicating with query clients 208 and data sources 204. Illustrative interface methods are discussed below.

MIS 300 may expose an IMISServerRoot interface having the following method:

HRESULT Connect Client([in] IMISClient *pclient, [out, retval] IMISServerClient **pserver);

This is the root object that a client may perform a CoCreateInstance call on. After getting the interface, a ConnectClient call may be used to pass the IMISClient interface to MIS 300. MIS 300 may then pass back the IMISServerClient interface to establish a two-way connection.

The IMISServerClient interface has the following methods:

HRESULT Query([in]VARIANT varQuery, [in] BSTR bstrURL, [in] VARIANT_BOOL vfpersistable, [out, retval] IMISQueryResult **ppresult);

HRESULT QueryAsync([in] VARIANT varQuery, [in] BSTR bstrURL, [in] VARIANT_BOOL vfpersistable, [out, retval] MISHANDLE *pmishQuery);

HRESULT UnregisterQuery([in] MISHANDLE mishQuery);

Queries may be sent to an information server 200 synchronously or asynchronously in, for example, BSTR, IStream or IXMLDOMDocument. The caller may supply a URL to identify itself for access control. The caller may also specify whether a query should be persisted when the data source 204 is unavailable. Persistence is discussed in more detail below in Section III.I., entitled Persistence of Unfulfilled Queries.

A notification attribute may be set on the query to register for notification. An UnregisterQuery method may be used to unregister the notification.

When the IMISServerClient interface on the client side is released, the connection is broken.

Clients may expose an IMISClient interface having the following methods:

HRESULT SendQueryResult([in] IMISQueryResult *presult);

HRESULT Notify([in] IMISNotification *pnotification);

HRESULT Transform([in] BSTR bstrName, [in] IUnknown/*IXMLDOMDocument*/ *pdomSrc, [out, retval] Iunknown/*IXMLDOMDocument*/ **ppdomDest);

When an asynchronous query result is ready, a SendQueryResult call may be made to the query client 208. When a notification is generated from the data source 204, a Notify call may be made to the query client 208, passing a notification object. If a custom transformation exists in the query, a Transform call (<transformation>) may be made to transform the query result.

MIS 300 may connect to data sources 204 via COM's CoCreateInstance call. Data sources 204 may be implemented as either an out-of-proc COM server or an in-proc COM server, as long as the IMISDataSource interface is exposed. This interface may have the following methods:

HRESULT Query([in] MISHANDLE mishQuery, [in] BSTR bstrURL, [in] IUnknown/*IXMLDOMDocument*/ *pdomQuery, [out, retval] IUnknown/*IXMLDOMDocument*/ **ppdomResult);

HRESULT ConnectDataSource([in] IMISServerDataSource *pserver);

After the CoCreateInstance call, MIS 300 may call ConnectDataSource and may supply an IMISServerDataSource to establish the two-way connection. Queries may be sent to data sources 204 synchronously via the Query method. The query and/or the result may be in DOM. As is known in the art, DOM is an acronym for Document Object Model, a World Wide Web Consortium specification that describes the structure of dynamic HTML and XML documents. In DOM, a document is presented as a logical structure rather than as a collection of tagged words.

IMISServerDataSource may have the following method:

HRESULT Notify([in] VARIANT varNotify, [in] MISHANDLE mishQuery);

This method may be used to respond to notifications from data sources 204. The notification content may come in BSTR, IStream or IXMLDOMDocument, for example.

For security reasons, the above interfaces may be unscriptable binary interfaces. However, the results and notification interfaces may be exposed as dual interfaces, so that they may be used in HTML pages.

IMISQueryResult may have the following methods:

[propget, id(DISPID_MIS_RESULT_QUERYID)] HRESULT queryid([out, retval] MISHANDLE *pmishQuery);

[propget, id(DISPID_MIS_RESULT_DOM)] HRESULT resultDOM([out, retval] IUnknown/*IXMLDOMDocument*/ **ppdomResult);

[propget, id(DISPID_MIS_RESULT_STRING)] HRESULT resultString([out, retval] BSTR *pbstrResult);

[id(DISPID_MIS_RESULT_STREAM)] HRESULT GetResultStream([in] IUnknown/*IStream*/ *pstreamResult);

[propget, id(DISPID_MIS_RESULT_ERROR] HRESULT error([out, retval] IMISQueryError **ppqerror);

Results may be retrieved in BSTR, IStream or IXMLDOMDocument, for example. Unless an unexpected error happens, the Query method will return a success code. However, the query may actually fail. A real-failure code may be stored in an error object (IMISQueryError). The caller may get the error object and examine the condition after the query result is received.

IMISQueryError may have the following methods:

[propget, id(DISPID_MIS_ERROR_CODE)] HRESULT errorCode([out, retval] long *perrorCode);

[propget, id(DISPID_MIS_ERROR_URI)] HRESULT datasrcURI([out, retval] BSTR *pbstrURI);

[propget, id(DISPID_MIS_ERROR_REASON)] HRESULT reason([out, retval] BSTR *pbstrReason);

[propget, id(DISPID_MIS_ERROR_SRCTEXT)] HRESULT srcText([out, retval] BSTR *pbstrSrc);

[propget, id(DISPID_MIS_ERROR_PARSEERROR)] HRESULT parseError([out, retval] IXMLDOMParseError **ppxerror);

The error code may be an hresult. If it is MIS_E_QUERYPARSEERR, the parseError object may be retrieved (XML parse error). If the error code is MIS_EQUERYPROCESSERR, datasrcURI may contain the location where the error occurs, reason may contain the error description, and srcText may contain the source code for the query where the error occurred.

IMISNotification may have the following methods:

[propget, id(DISPID_MIS_NOTIFY_QUERYID)] HRESULT queryid([out, retval] MISHANDLE *pmishQuery);

[propget, id(DISPID_MIS_NOTIFY_DOM)] HRESULT notifcationDOM([out, retval] IUnknown/*IXMLDOMDocument*/ **ppdomResult);

[propget, id(DISPID_MIS_NOTIFY_STRING)] HRESULT notifcationString([out, retval] BSTR *pbstrResult);

[id(DISPID_MIS_NOTIFY_STREAM)] HRESULT GetNotifcationStream([in] IUnknown/*IStream*/ *pstream);

Notifications may be retrieved in BSTR, IStream or IXMLDOMDocument, for example.

Local query clients 208 may use these interfaces via COM or DCOM. To communicate with a server via the Internet, an HTTPCommunicator component may translate a communication to an HTTP request. MIS 300, however, may be implemented other than as an HTTP server such that it does not listen for requests. So a server would not be able to actively establish a connection to MIS 300. An HTML page may connect to MIS 300, though, via IMISServerClient (via an ActiveX control, for instance) and may send an XML-coded communication initiation request to MIS, as shown in the following example:

<connect>
 <server>http://www.moneycentral.com/ . . . </server>
 </connect>

The HTTPCommunicator may send an HTTP request to a web server. The query from the web server may be carried back on the HTTP request's return string. The query result may then be sent to the web server via another HTTP request. This process may go on until queries stop coming down from the web server. As a result, the query from a web server may be executed asynchronously. The accessor under these circumstances may be the web host address of the URL. The accessor string may be used to identify the caller so that access rights may be granted.

III.C. Data Sources

The types of supported data sources 204 may include, but are not limited to: data sources containing relational, or semi-relational, raw data; higher-level data, such as reports or calculation results; and messages or discrete actions, such as a message instructing a data source to perform a specific action.

The following sections III.C.1. through III.C.8. provide examples of various types of data sources 204 that may implement interfaces, which are discussed above, for interacting with an information server 200.

III.C.1. OFD Data Source

OFD (open financial data) 308 is Money's underlying database engine. Data stored in a user's Money file may be accessed via OFD 308. An OFD data source 204 may expose this raw data-accessing ability. Queries can be constructed to read contents of OFD tables, update the tables, create new items in the tables, and delete existing items. Investment transaction calculation ability may also be exposed through a trancalc object. This data source 204 may be coded as an in-proc COM server that loads directly into MIS 300.

III.C.2. Report Data Source

Money generates several reports including: expense/income, net worth calculation, cash flow, and asset allocation. The generated report data may be exposed via a report data source 204. A query to the report data source 204 may be issued to ask for a report with a given type and subtype. Some report customization parameters may also be passed in the query, such as a date range for a report. The report data source 204 may run in Money as an out-of-proc COM server separate from MIS 300. MIS 300 may access the report data source 204 with COM's inter-process communication mechanism.

III.C.3. Planner Data Source

Money includes a lifetime planner that offers rich data about a person's, or family's, long-term financial goals and situation. The lifetime planner also has a long-term forecast engine that performs lifetime forecast of financial well being. These may be exposed through the planner data source 204. The planner data source 204 may run in Money as an out-of-proc COM server separate from MIS 300.

III.C.4. Tax Data Source

Money may export calculated tax line and capital-gains information to tax software, such as TaxCut® income tax preparation software from H&R Block. This ability may be exposed through the tax data source 204. Like the report and planner data source 204, the tax data source 204 may run in Money, separate from the MIS process.

III.C.5. Statement Reconciliation Data Source

After bank statements are downloaded into a user's Money data file, the statements are typically reconciled for inclusion into the user's account register. A reconciliation data source 204 may be used to trigger the reconciliation process from an external source, such as Money's background banking code. This data source 204 may run in Money, separate from the MIS process.

III.C.6. Online Background Banking Data Source

An online data source 204 may be used to trigger downloading of stock quotes, account statements, and the like. This data source 204 may be used in conjunction with background banking. Online banking refers to a suite of features that help a user perform common financial management tasks and keep the user's Microsoft(D Money data up-to-date. By connecting to various resources on the Internet, a user can download statements from the user's banks and brokerages, pay bills, and update the user's portfolio automatically. With background banking, a user can perform these tasks while working in other applications or while away from the user's desk. The online data source 204 may run as an in-proc COM server in the MIS process, separate from Money, so that background banking can happen while Money is not running.

III.C.7. UPS Data Source

A UPS (user profile store) data source 204 may be used for retrieving data stored in a given UPS namespace. For security reasons, only a portion of the data, such as accounts/transaction on MoneyCentral, may be exposed. This data source 204 may be built to retrieve accounts/transactions directly from UPS without going through a MoneyCentral server.

III.C.8. UPS-OFD Data Source

A UPS-OFD (user profile store-open financial data) data source 204 may behave like a conditional query dispatch between a UPS data source 204 and an OFD data source 204. When accounts-and-transaction information is accessed, a query may be directed to the OFD data source 204 if it exists on the local machine. Otherwise the UPS data source 204 may be used to retrieve information from the user's roaming data. The UPS-OFD data source 204 may be used to provide transparency to a client that is querying MIS 300 for data. This type of data source 204 may be used for locating and providing to the caller data that can be found from whichever source is more appropriate.

III.D. Query Language

An information server system 206 in accordance with an illustrative embodiment of the invention, may include a query language as discussed below.

Data sources 204 may connect to an information server 200 via the IMISDataSource and IMISServerDataSource interface pair. The information server 200 may process queries and send results back to the query client 208. A query may be in the following form:

<query     xmlns="urn:schemas-microsoft-com:money-query">
    // other query content goes here
    </query>

The retrieval result may be returned wrapped in a <list>element:

<list       xmlns="urn:schemas-microsoft-com:money-query">
    // query result goes here
    </list>

Other action results may return an empty result.

Calls to data sources 204 from an information server 200 may be synchronous, even though the original query from a client may be asynchronous.

When a query error occurs at a data source 204, an MIS_E_QUERYPROCESSERR may be returned to indicate that the results coming back are in the form:

<error>
    <description> . . . </description>
    <source> . . . </souce>
    </error>

An error element of this type may be parsed and put into a query error object.

III.D.1. Sample Query

A sample MIS query is set forth below:

```
<query xmlns="urn:schemas-microsoft-com:money-query"
       xmlns:q="urn:schemas-microsoft-com:ofd-datasrc">
    <transaction>
        <delete>
            <q:acct>
                <q:acct.szFull>testacct2<eq/></q:acct.szFull>
                <q:ast>0<eq/></q:ast>
                <q:at>0<eq/></q:at>
                <q:amtOpen>1000<eq/></q:amtOpen>
                <list name="hcrnc">
                    <q:crnc>
                        <q:szName>US dollar<eq/></q:szName>
                    </q:crnc>
                    <include/>
                </list>
                <and/>
                <and/>
                <and/>
                <and/>
            </q:acct>
        </delete>
    </transaction>
</query>
```

In the sample query above, the first two lines identify the query schema and data source 204. The statements between <delete> and the <and/>'s are a set of filtering criteria that tells the datasource what accounts to delete.

The semantics of at least portions of a query may be tied to the data source 204 and not to the system as a whole. In this way, flexibility is provided because, ultimately, an information server 200 will pass a portion of the query through to the intended data source 204. Accordingly, a portion of the query may be unique to the data source 204 itself. Different portions of a single query sent to an information server 200 may therefore contain different syntax for parts of the query that will be passed to different data sources 204. As a result, an information server system 206 need not be dependent on only a single query language.

An example query to two data sources 204, such as a planner data source and an OFD data source, may be constructed in the following format:

```
<query    xmlns = ... >
    <list    xmlns:p = " ..."
```

```
            xmlns= ofd= " ...">
    <p:asset>
        <filter>
            <p:ofdhobj
                <ofd:account
                    <ofd:name> ... . <eq/> <...>
                </ofd:account>
                <link>
                    <ofdhobj/>
                </link>
        </filter>
</query>
```

There are actually three namespaces in the example above. One is the default namespace, which belongs to the query. And there are two others that are specific to each data source. P being the planner, in this case, and OFD being the database (Open Financial Database). Anything associated with the default namespace belongs to the common language being used by the information server 200. This part of the query can be considered as shared between the data sources 204. Anything that belongs to a specific namespace, such as P or OFD, belongs to that specific data source 204. An information sever may pass these portions of the query through the system. In the example above, a list of assets from the planner data source is being constructed by filtering and then linking a field in the planner data source 204 with a field in the OFD data source 204, which may produce a list of assets for the accounts retrieved from the OFD data source 204.

The query, list, filter, and link elements are information server-specific semantics in the example above. An information server 200 may parse the example query above and construct a simple query directed to a single data source 204, such as a query in the form:

<query

. . .

<ofd: account

</query>

The information server 200 may retrieve the part that is specific to the OFD data source 204 and construct a new simpler query and send it to the OFD data source 204, which may then respond to the simplified query. The information server 200 may then get the query result from the OFD data source 204. The information server 200 may then construct an outer query to be sent to the planner data source 204 and may inject the query result received from the OFD data source 204 into the outer query. The information server 200 may then issue a query specific to the planner data source 204. Upon receiving the query result from the planner data source 204, the information server 200 may then parse the query result received from the planner data source 204 and construct an XML-based query result to be sent back to the query client 208. The information server 200 may use information contained in the query received from the query client 208, such as the link field in the example above, to determine what sub-queries should be issued to particular data sources 204 are and how queries and/or query results relate to each other.

Figure 5:
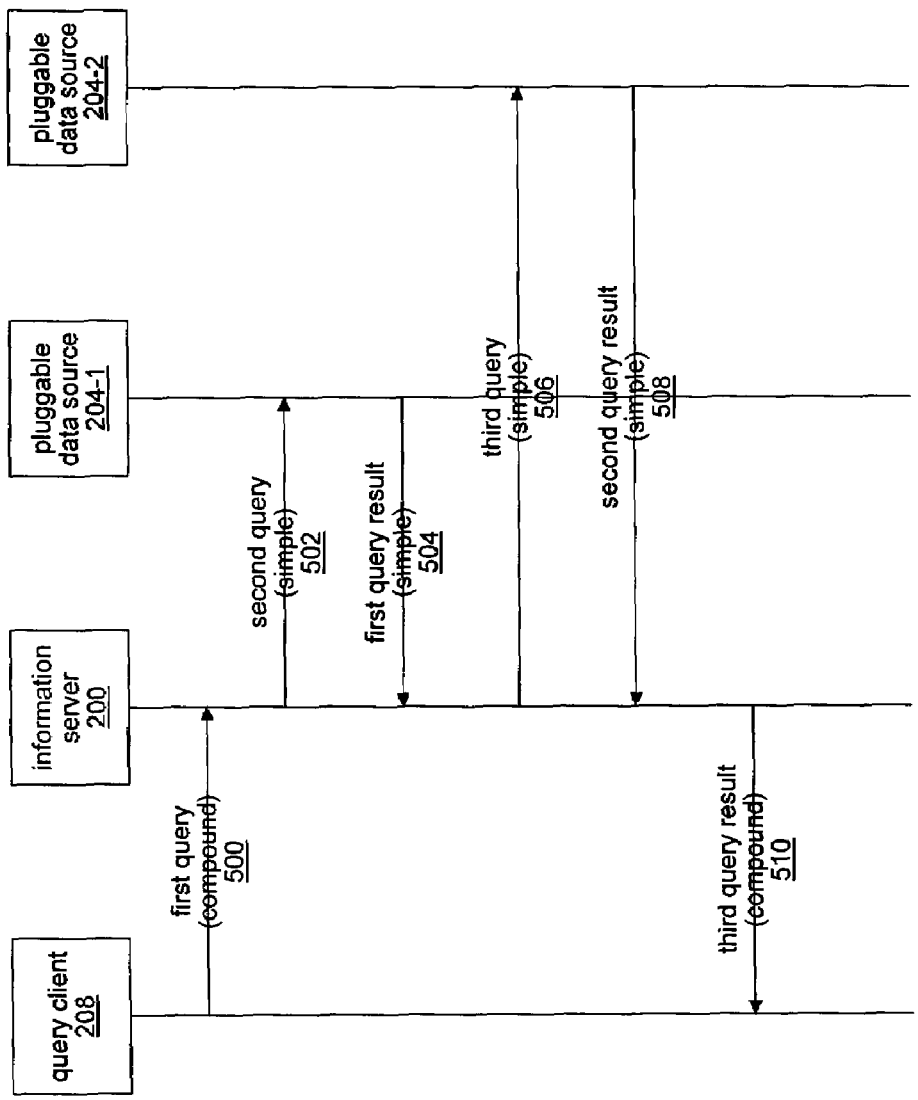
FIG. 5 is a data flow diagram showing queries and query results being sent between a query client, an information server, and pluggable data sources in accordance with an illustrative embodiment of the invention.

FIG. 5 depicts a data flow in an information server system 206 in accordance with an illustrative embodiment of the invention. A query client 208 sends, as indicated at 500, a first query to an information server 200. The query may be a compound query, which means that it is querying multiple data sources. The information server 200 then sends a second query, as indicated by 502, to a first pluggable data source 204-1. This second query may be a simple query, which means that the second query queries only a single data source.

The first pluggable data source 204-1 then returns, as indicated at 504, a first query result, which is a simple query result. The information server 200 may then combine the first query result into a third query, which may be sent, as a simple query and as indicated at 506, to the second pluggable data source 204-2. The second pluggable data source 204-2 may then return, as indicated at 508, a simple query result to the information server 200. The information server 200 may then return, as indicated at 510, a compound query result to the query client 208.

In the example above, the two data sources 204 advantageously do not need to know how data is organized in the other data source 204. The information server 200, though, provides a semantic provision and a processing provision, as a centralized query broker, that has an ability to coordinate between the data sources 204 a potentially complex action that the top level programmer, the calling programmer, knows about without forcing the programmer to change the two data sources 204. If there is a logical connection between two very different data sources 204, then a query may be formulated to express it without having to alter the data sources 204. And an information server 200 may coordinate interaction between disparate data sources 204 and provide query results that include query results obtained from disparate data sources 204.

The sample query discussed above is a relatively relational example. If the two data sources 204 were different, for instance, a categorized list of MP3 files maintained in a spreadsheet and the file system itself, some logical key that connects these two data sources 204, such as a base file name that is maintained for each artist, an attribute available from the filename, or some piece of information stored within the MP3 files, for example, may be used to link data from the two data sources 204. A query could then be constructed that would return in name order a set of filtered files based on extra information maintained in the spreadsheet, for instance. So, a link represents a conceptual connection. If there is a piece of information that connects data from two data sources 204, then a query can be constructed to ask an information server 200 to join the data from the two data sources 204 in accordance with the invention.

III.E. Query Fulfillment

Figure 4:
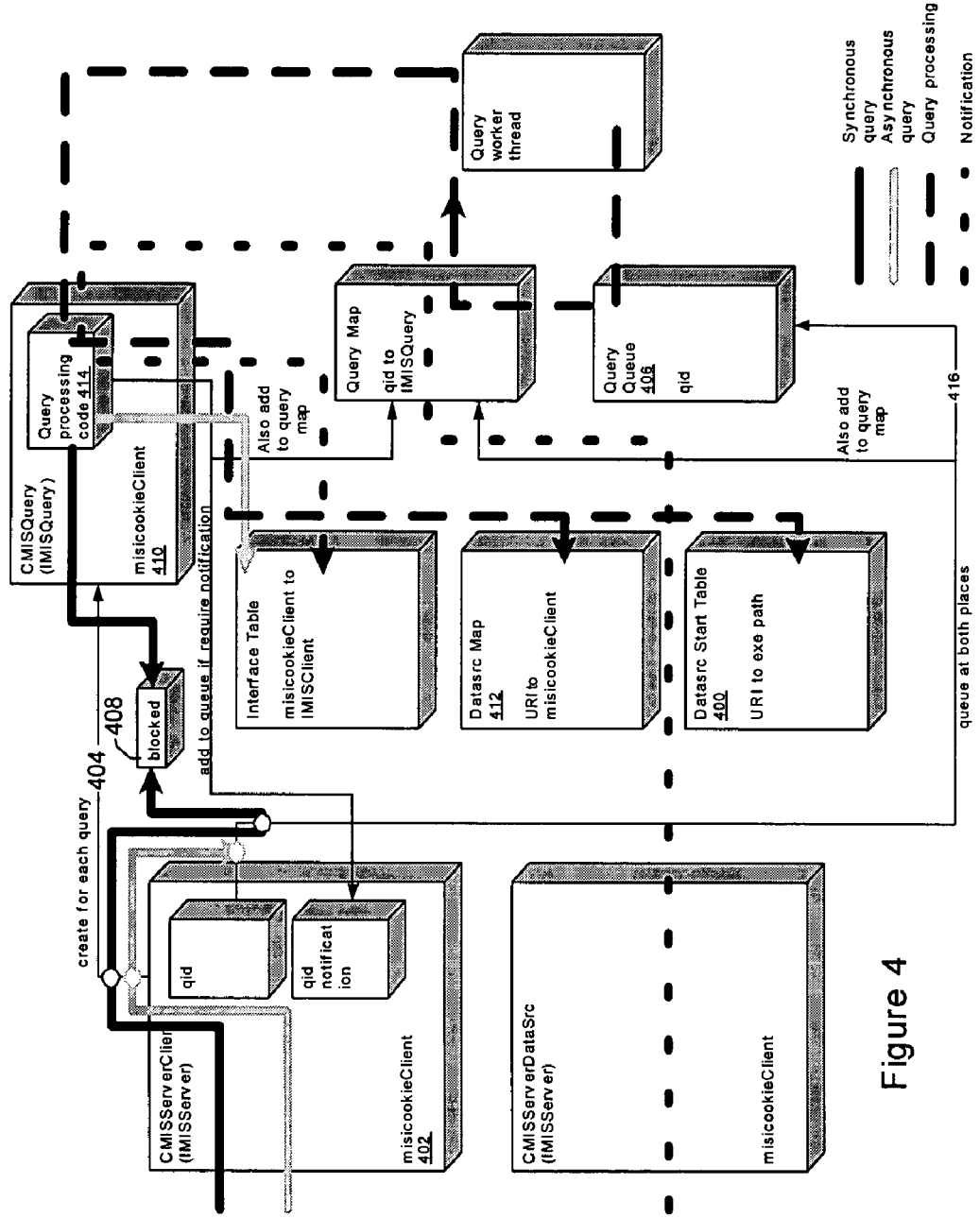
FIG. 4 is a schematic block diagram depicting query processing within an information-server system in accordance with an illustrative embodiment of the invention.

FIG. 4 depicts data flow within an information server system 206 in accordance with an illustrative embodiment of the invention. This figure shows how a query may be processed and how data sources 204 may be selected to fulfill a query.

Queries may be either synchronous or asynchronous. A synchronous query is shown coming into CMISServerClient 402 and a query object may be created for the query, as depicted by arrow 404. A synchronous query may be queued up in the query queue 406, as indicated by arrow 416, and the calling thread may be blocked 408. Another thread, CMIS query 410, may then pick up the query from the query queue 406 for determining which one or more data sources 204 are responsible for fulfilling the query. This determination may be made by accessing the data-source map 412 and a data source start table 400, which is discussed below. Then, the data sources 204 may be instantiated. The query may then be dispatched to the data sources 204 for query fulfillment. The result comes back, and the query processor 414 may provide the query results to the calling thread for the query. The calling thread then gets unblocked and may resume execution.

A query to be fulfilled will typically originate from a query client 208. Such a query may be formulated in accordance with a query language. The syntax may include specification of the URN for each data source 204 that is responsible for fulfilling a particular query. The information server 200 may use the URNs to look through the datasource map 412 and figure out which object is responsible for fulfilling the query. The data source start table 400 may include a list of data sources 204 instantiated by an information server 200. The data source start table 400 may include a handle, depicted by arrow 222 in FIG. 2, for each instantiated data source 204. In this way, the data source start table 400 effectively maintains an awareness of data sources 204 that have been instantiated and maintains handles 222, which may be used subsequently, for accessing those data sources 204.

When a data source 204 is instantiated, bi-directional communication, as indicated by double-headed arrow 218, may be established. An information server 200 may instantiate a data source 204 and create a handle 222 referencing the data source 204. The data source 204 may also get a handle referencing the information server 200 with another interface, which may be defined for communicating a result back to the information server 200.

In an asynchronous model, when an information server 200 receives a query from a query client 208, the information server 200 may forward the query to one or more data sources 204. The query client 208 does not then need to wait for the query results to come back. The data source 204 may process the query, construct the query result in an appropriate format, such as XML, and send the query results back to the information server 200, which may then forward the query results to the query client 208 through, for example, a callback mechanism.

Asynchronous query fulfillment may be useful when operating in a distributed environment in which blocking a calling client's execution of other processing, while the query is being fulfilled by the information server system 206, would be undesirable.

III.F. Transformation declaration

A query-language specification may allow for a custom transformation mechanism. A query client 208 may respond to a transformation via a Transform method of the IMISClient interface discussed above.

During query processing, the transformation may be sent to the query client 208 as:

<list xmlns="urn:schemas-microsoft-com:money-query">
// xml results to be transformed
</list>

The transformed result may be sent back in XML with the surrounding <list>tag.

III.G. Notification

Query results may change when the underlying data changes. A notification mechanism may be used to keep the query results live, and to allow code to be executed to handle the change on the caller side.

Three levels of notification may be supported: Application level (tight notification). This may be used by application-level code to query for results and receive prompt updates. An HTML page may use outside application level (loose notification) in which query results are not updated automatically unless a query is reissued. Server level (server notification) may be used to keep server persistence synchronized with user data. There may be a significant delay between updates. Server notification may, therefore, be implemented via periodic polling.

For outside application level, also referred to as loose notifications, an information server 200 may send one or more notifications to the query client 208. The information server 200 may not automatically update the query result for the query client 208. The query client 208 may re-query for an updated result. An information server 200 may, however, cache query results for queries that have registered for notification. The cache may be updated when any underlying change happens so that a re-query will get back a query result more quickly than would otherwise occur without caching of this type.

Notification may be coded in XML in the following form:
<notify>
<ofd:notify xmlns:ofd="uri">
. . .
</ofd:notify>
</notify>

A query id may be sent to a query client 208 in a programmatic interface. Inside <notify>there may be data source-specific notification content. Since different data sources 204 may have different notification semantics, data sources 204 may be allowed to define their own notification schema. A namespace may be used to indicate which data source 204 is responsible for generating a notification. In the event that a data source 204 does not implement a data source-specific notification schema, the <notify>may be left empty.

In accordance with an illustrative embodiment of the invention, an information server 200 may not. batch notifications from different data sources 204 together. The notifications may be sent as separate notifications. It may be the client's responsibility to batch them up, if desired. In this way, a query client 208 may be given more control, with the information server 200 not needing to know whether a particular query client 208 needs fast or slow reaction to the notifications. This mechanism may also be used for the server-level notification case. The HTTPCommunicator component may send a notification to the server and wait for further query instructions. To avoid the same query being issued to two information servers and not being able to be canceled because the information servers are no longer connected, the server may maintain internal state information to keep only one query notification active and may cancel any others when appropriate.

Notification may be synchronous with respect to the query that generates the notification. This means that, when a query is changing a piece of data, which results in notification to a query client 208, the notification may be sent and processed before the query that causes the notification is fully completed.

III.H. Security

An information server 200 may be used to expose user data through a common interface that is intended to greatly simplify data access. This raises security issues. Any permutation or combination of the following ascending levels of security may be used:

Network communication may be encrypted so that other parties cannot meaningfully access the communication. The identity of the query client 208 may be authenticated. Users may be allowed to specify access control, such as who is allowed to get what information.

If network communication is over the Internet, data encryption may be done via SSL. SSL is an acronym for the well-known Secure Sockets Layer protocol for ensuring security and privacy in Internet communications. SSL supports authentication of client, server, or both, as well as public-key encryption during a communications session. Responsibility for using the right communication mechanism with a server may be delegated to the data sources 204.

The identity of the query client 208 may be provided via an information server 200 programmatic interface as a URL. URL is an acronym for Uniform Resource Locator, which— as is well-known—refers to an address for a resource on the Internet. Responsibility for gathering the correct identity information may be delegated to the query client 208.

A customized access matrix may be used for access control to specify which query clients 208 are authorized to get what particular information. Three types of controls may be offered: allowed, prompted, and denied. Read, Create, Update, and Delete may be assigned with different types of controls. Various levels of granularity may be used. A variable-named granularity may be used in which a granularity is given a name and then its scope in the data source 204 is programmatically specified. This is an efficient scheme because access control does not need to be specified down to the field level, which would require a lot of bandwidth. In this way, the ability is retained to grant access control with boundaries as fine as at the field level. The access control information may be stored on a server and identified as belonging to a particular user. For instance, UPS may store the access control information under a user's Passport. UPS is an acronym that refers to a user's profile store. And Passport is a well-known authentication system. The access control information may be retrieved and updated periodically by an information server 200. A data source 204 may access this information from an information server 200 via the IMISSecurity interface.

III.I. Persistence of Unfulfilled Queries

At any given time, one or more data sources 204 may be unavailable to an information server 200. There are two common scenarios. First, the user is offline at home. Under these circumstances, queries to online data sources 204 cannot be fulfilled. Second, the user is at work, where Money is not installed, and no Money file is present. Queries to Money data sources 204 (such as OFD and planner) cannot be fulfilled.

To provide users with maximum flexibility, a persistence facility is provided to save off any unfulfilled queries, and forward them whenever the intended data source 204 becomes available. This means that, in the first case, the online queries are delayed until the user connects online. In the second case, when the user returns home, where Money data sources 204 are available, the queries are executed. Persisted queries may be restricted to action queries that do not retrieve data, because delayed retrieval queries are typically of less value to a user.

A persistence object may be viewed as a unique type of data source 204 with behavior that can be easily changed in the future. The persistence object may accept queries only from an information server 200. The persistence object may connect to an online store (such as UPS) whenever possible. If the persistence object cannot access the online store, queries may be saved in an offline store. The order of the queries may be preserved, which means, whenever new queries come in, an information server 200 may verify that the intended data source 204 can respond. If the data source 204 can respond, the persistence store may be examined, old queries may be issued in their original order, and the new query may be issued after the queued queries. If the data source 204 cannot respond, the query may be saved in the persistence store.

For mixed queries (i.e., queries to multiple data sources 204), query processing may be serialized and performed until a data source 204 does not respond. The portion of the query not yet responded to may then be persisted. In the absence of new queries coming in, an information server 200 may periodically examine the persistence store, poll the data sources 204 for availability, and issue queries to data sources 204 when they become available. The persistence store may return a query status code to indicate whether the query is being queued in the persistence store.

An XML schema may be provided for allowing the query client 208 to request information from the information server 200 regarding the availability of a particular data source 204. In this way, the query client 208 can behave differently depending on the availability, or lack of availability, of a particular data source 204.

A query client 208 may specify that a particular query should not be persisted in the event that a data source 204 is unavailable. This may be specified in the <query>element.

Queries queued up by the persistence facility 224 may be viewed as atomic with respect to the single query itself. An acknowledgement code may be sent back to the information server 200 to indicate that a query has been queued up successfully.

Query persistence is not equivalent to asynchronous processing. Asynchronous processing means that the caller sets up the query and gets back control quickly without knowing whether the query is persisted, executed successfully, or has failed. The return codes may be sent to the caller via callbacks. For synchronous processing, however, the caller waits for the return code, which may be an indication that the query has been persisted.

Support for persisted retrieval query may be omitted to simplify implementation and increase efficiency. However, in some cases, a persisted retrieval may be beneficial. For example, a light version of MoneyExpress may run on a user's machine at work. A retrieval query may be issued by MoneyExpress to retrieve upcoming bills from an appropriate Money data file. The query may then be fulfilled when the user connects online from home.

A push model may be used, where bills are pushed by Money through MIS's persistence store to MoneyExpress or some other application. Since this would be a write operation, it may be supported by a persistence function of MIS 300. The solution also means that MoneyExpress may be coded as a data source 204 instead of a query client 208. In most cases, an application program may be both a query client 208 and a data source 204, as is the case with Microsoft® Money.

III.J. Result Roaming

Because of the sensitive nature of a user's financial data, and the size of the data, it is typically undesirable to roam all of a user's data onto a networked server. There are times, however, when a user may want to be able to query a server for the user's data. To facilitate this, result roaming may be provided. Result roaming is like taking a snapshot or view of the raw data, and recording it on a networked server. Since the query that requires roaming data may be limited or fixed, the same query may be periodically issued on a computer having the data stored locally. The query result may then be saved on a networked server. When the user roams, and the same query is issued, a query can be issued to the networked server to retrieve the previously-saved query result. The result might be slightly out of synchronization, but the saved query results should be available from the server. This process is different from, and simpler than, synchronization because changes on two computers do not need to be reconciled. Recent changes to the data stored locally on a user's machine may not be reflected, though, on a roaming machine. The computer with the user's data stored locally would have to be run to cause a write operation, which would then cause the change to be reflected on the networked roaming data server.

IV. Concluding Remarks

What has been described above is merely illustrative of the application of the principles of the invention. Those skilled in the art can implement other arrangements and methods without departing from the spirit and scope of the present invention. For instance, an information server system 206 with pluggable data sources 204 may be implemented in CORBA (Common Object Request Broker Architecture) or SOAP (Simple Object Access Protocol). Any of the methods of the invention can be implemented in software that can be stored on computer disks or other computer-readable media.

We claim:

1. An information-server system comprising:
    at least one pluggable data source, registration information of which is stored in an information server, the registration information indicating the at least one pluggable data source's existence; wherein the information server uses the stored registration information to determine which data sources are available for responding to queries from the information server; wherein the information server system is a Money Information Server (MIS) system which includes said pluggable data source, said pluggable data source provides information regarding the query client's financial data file in response to the queries from the information server;
    a set of uniform access interfaces;
    at least one query client that uses the set of uniform access interfaces to send to the information server a first query at least a portion of which is to be dispatched by the information server to the at least one pluggable data source, wherein said portion includes information regarding the query client's financial data stored on said at least one pluggable data source;
    a persistence store for storing the first query if said at least one pluggable data source is not available to respond to the first query, wherein an acknowledgement code is sent to the information server the first query is queued up successfully;
    wherein the information server uses the set of uniform access interfaces to dispatch to the at least one pluggable data source, a second query, when the pluggable data source becomes available, the information server accesses the persistence store to retrieve the first query and uses the first query to send the second query which includes at least said portion of the first query;
    wherein the at least one pluggable data source uses the set of uniform access interfaces to return to the information server a first query result based on the received second query from the information server;
    wherein the information server uses the set of uniform access interfaces to send to the query client a processed second query result based on the first query and the first query result.

2. The information-server system of claim 1, wherein the first query causes at least one of: reading data from the at least one pluggable data source, writing data to the at least one pluggable data source, and instructing the at least one pluggable data source to perform a specified action.

3. The information-server system of claim 1, wherein the first query queries a plurality of the at least one pluggable data sources.

4. The information-server system of claim 3, wherein the second query queries no more than one of the at least one pluggable data sources.

5. The information-server system of claim 3, wherein the first query result contains information from no more than one of the at least one pluggable data sources.

6. The information-server system of claim 5, wherein the second query result contains information from the plurality of the at least one pluggable data sources.

7. The information-server system of claim 1, wherein the second query includes a data source-specific portion of the first query.

8. The information-server system of claim 1, wherein the second query is dispatched to the at least one pluggable data source in accordance with a portion of the first query that is information server-specific and that specifies to which data source the information server should dispatch the query.

9. The information-server system of claim 1, wherein the information server dispatches the second query in accordance with resource-location information contained in a data-source map.

10. The information-server system of claim 1, wherein the information server dispatches the second query to a fallback pluggable data source when a primary pluggable data source is unavailable.

11. The information-server system of claim 1, wherein, upon unavailability of the at least one pluggable data source, the information server stores the second query so that the second query can be sent to the at least one pluggable data source when the at least one pluggable data source becomes available to provide the first query result.

12. The information-server system of claim 11, wherein, after the at least one pluggable data source transitions from unavailable to available, the information server sends the stored second query to the at least one pluggable data source.

13. The information-server system of claim 1, wherein the information server system includes an authentication layer that prevents unauthorized access to the at least one pluggable data source.

14. The information-server system of claim 1, wherein the uniform access interfaces include two or more of the following interfaces: Extensible Markup Language (XML) interfaces, Component Object Model (COM) interfaces, Document Object Model (DOM) interfaces, and Hypertext Markup Language (HTML) interfaces.

15. The information-server system of claim 1, wherein said pluggable data source is implemented as a Component Object Model (COM) server wherein the COM server is constructed as either an out-of-proc server or in-proc server.

16. The information-server system of claim 1, wherein the MIS system periodically examines the persistence store and polls the availability of the pluggable data sources and issues queries based on the examination results.

17. The information-server system of claim 1, wherein an interface of the pluggable data source is self-registering and self-describing at install time to the MIS system so that additional pluggable data sources can be added without modifying the MIS system.

18. The information-server system of claim 1, wherein one or more of the following pluggable data sources can be added to the MIS system: Open Financial Data (OFD) source, User Profile Store (UPS) data source, and UPS-OFD source.

* * * * *

UNITED STATES PATENT AND TRADEMARK OFFICE
CERTIFICATE OF CORRECTION

| | | |
|---|---|---|
| PATENT NO. | : 7,493,311 B1 | Page 1 of 1 |
| APPLICATION NO. | : 10/610258 | |
| DATED | : February 17, 2009 | |
| INVENTOR(S) | : Paul L. Cutsinger et al. | |

It is certified that error appears in the above-identified patent and that said Letters Patent is hereby corrected as shown below:

In column 21, line 33, in Claim 1, after "server" insert -- that --.

Signed and Sealed this
Third Day of May, 2011

David J. Kappos
*Director of the United States Patent and Trademark Office*